US005623890A

United States Patent [19]

Lenske

[11] Patent Number: 5,623,890

[45] Date of Patent: Apr. 29, 1997

[54] SAFE EXIT INDICATING FIREHOSE COUPLING

[76] Inventor: Gregory D. Lenske, 2328 S. 107th St., Milwaukee, Wis. 53227

[21] Appl. No.: 456,834

[22] Filed: Jun. 1, 1995

[51] Int. Cl.[6] .......... G01D 21/00

[52] U.S. Cl. .......... 116/205; 116/DIG. 17; 182/18; 285/93

[58] Field of Search .......... 116/205, DIG. 17; 182/18; 40/316, 570; 285/38, 93

[56] References Cited

U.S. PATENT DOCUMENTS

| | | | |
|---|---|---|---|
| D. 312,390 | 11/1990 | Clement | D8/395 |
| D. 345,519 | 3/1994 | Clement | D10/109 |
| 1,225,616 | 5/1917 | Gough | 285/38 X |
| 1,978,245 | 10/1934 | Barker | 285/93 X |
| 2,029,798 | 2/1936 | Schellin | 285/93 |
| 2,491,699 | 12/1949 | Wing | 116/205 X |
| 4,179,160 | 12/1979 | Sabo | 299/12 |
| 4,401,050 | 8/1983 | Britt et al. | 116/205 |
| 4,416,309 | 11/1983 | Salim | 138/104 |
| 4,844,000 | 7/1989 | Clement | 116/205 |
| 5,027,741 | 7/1991 | Smith et al. | 116/205 |

FOREIGN PATENT DOCUMENTS

| | | | |
|---|---|---|---|
| 254614 | 12/1961 | Australia | 116/205 |
| 2224154 | 4/1990 | United Kingdom | 116/205 |

*Primary Examiner*—William A. Cuchlinski, Jr.
*Assistant Examiner*—Willie Morris Worth
*Attorney, Agent, or Firm*—Richard C. Litman

[57] ABSTRACT

A firehose coupling which helps fire fighters determine the direction to safety along a firehose. The preferred embodiment of the firehose coupling incorporates an elongated extension integrally attached to each lug of a male component of the firehose coupling, which extends a predetermined length beyond the perimeter of the cylindrical body of the male component only, in a direction diametrically opposed to the direction by which said male component is inserted to couple with said female component. These extensions are easily identified visually, directing the fire fighter away from the fire and towards the source connection of the firehose. Additionally, the lug extensions may have raised or printed indicia on their surface further assisting a fire fighter. The tactile feature of the extensions are particularly advantageous in low visibility situations for fire fighters wearing heavy gloves, whereby a fire fighter need only momentarily and lightly catch his thumb against the lug extension, and without hesitation know the firehose's water source direction. Any extension or tab which extends beyond the perimeter of the cylindrical body of the male component may be incorporated intermittently along the circumferential edge of the firehose-accepting end of the male component's cylindrical body to form additional embodiments of the invention.

13 Claims, 6 Drawing Sheets

SAFE EXIT INDICATING FIREHOSE COUPLING

BACKGROUND OF THE INVENTION

1. Field of the Invention

The present invention relates to a firehose coupling which helps fire fighters determine the direction to safety along a firehose.

2. Description of the Prior Art

A primary concern of fire fighting personnel is that of becoming lost in a burning or smoke filled structure where the fire fighter does not know the direction to the outside. Fire fighters are commonly taught to follow the firehose lines, knowing that the firehose connects from an outside source of water to the water spraying nozzle. However, under the stresses and pressures of a fire emergency, a fire fighter may lose his sense of direction and, upon finding a firehose, may be unable to conclude which direction leads to the outside water source and which direction leads to the nozzle. As is well explained in U.S. Pat. No. 4,844,000, innumerable other problems can arise which further minimize the chances of a safe escape.

Thus various escape aids have been developed to assist lost fire fighters determine the direction along a firehose to the outside water source connection. The devices so developed rely on concepts commonly described in the prior art, such as application of tactile and visual means to an object to assist a user in finding an exit. Although tactile and visual means have been variously applied directly to a firehose, none have been applied to firehose couplings. As will be explained below, numerous advantages are gained by applying the concept of a tactile and visual indicator to a firehose coupling over any application to a firehose.

Specific applications of tactile and visual indicators as applied to firehoses are discussed first. U.S. Pat. No. 4,844,000 issued Jul. 4, 1989 to Clement describes a flexible band or clamp with directional fingers protruding perpendicularly from the band. The band is attached to firehoses and helps indicate the direction to the water connection source of the firehose. The clamp thus allows a fire fighter to feel along the firehose and determine the direction to the exit. The clamp is a flexible removable band which must be retrofitted along the length of the firehose. The embodiments described include a steel spring clamp capable of being slipped over an unrolled firehose and a flexible band with fastener which encircles the firehose and may remain on a stored firehose. U.S. Pat. No. Des. 312,390 issued Nov. 27, 1990 and U.S. Pat. No. Des. 345,519 issued Mar. 29, 1994, both to Clement, show various embodiments of the directional bands as essentially described in Clement's '000 patent.

However, certain problems are inherent in a device which must be attached by encircling a firehose. Such a device must be able to withstand heat; must be able to withstand sudden expansion or change in shape caused by the high water pressure through a firehose; must be able to withstand abuse to its surface when being dragged over rough surfaces; and must be able to avoid snagging objects and hampering movement of the firehose. Yet, simultaneously the device must also be able to remain sufficiently flexible to allow the firehose to be stored in a flattened coil or roll; must be able to avoid restriction of water flow by kinking a firehose; and, most importantly, must be able to withstand being dislodged or removed through abuse of the hose so that the device is there when the fire fighter needs it.

Understanding the above problems makes the disadvantages seen in the various embodiments of the Clement inventions readily apparent. For example, the spring clamp embodiment can rust if made of heat resistant and flexible steel; to prevent the rust, it must be covered with a suitable heat resistant material. Furthermore, a removable device with an aperture along its circumference is prone to loss. Each of the clamp embodiments of the '000 or '390 patents must have an aperture along its circumference to enable attachment onto the firehose; therefore, the resulting sharp edges of the spring clamp must be rolled to avoid tearing the firehose. Fasteners used on the other embodiments can come undone because of snagging of the band or incomplete fastening of the fastener. Moreover, flexible materials, if fire resistant, for manufacture of the clamps may be costly.

Furthermore, even if many of these problems can be overcome, fire fighters wearing heavy gloves have a highly diminished sense of touch; hence, tactile directional indicators must be designed to accommodate this problem. The '519 patent shows an only slightly elevated "V" shaped directional indicator, which may be difficult to feel through heavy gloves. Finally, human error could be fatal; banding devices may be left off entirely if the time available to attach the device is limited. Even worse, devices put on backwards would lead the fire fighter into the fire rather than outside.

U.S. Pat. No. 5,027,741 issued Jul. 2, 1991 to Smith et al. addresses many of these problems in two embodiments of an emergency escape firehose. These embodiments incorporate stiff bristles permanently interwoven at an angle into the canvas surface of a firehose. In the first embodiment, the fibers' angle points towards the connection of the firehose with the water source so enabling a fire fighter to feel a smooth surface in that direction and a resistant surface in the direction towards the nozzle connection. In the second embodiment, the fiber angles are reversely inclined and the fire fighter must know that the direction towards the resistant feel of the firehose will lead him to the water source connection.

However, when a fire fighter is faced with a high pressure or panic circumstance, a safety escape device should also be intuitive to use, to minimize the need to use cognitive skills. A rookie fire fighter trying to remember whether the rough direction is to the fire (or was it the source?) has no intuitive clues whether "smooth" is out or "rough" is out. In contrast, everyone intuitively understands a pointer or directional arrow.

The third and fourth embodiments of the '741 patent include a series of annular members attached to the outer surface of the firehose wherein the annular member is inclined to indicate direction. A fifth and sixth embodiment include application of a luminous tapered stripe to the firehose. While these embodiments are more intuitive, they return to having the same problems and disadvantages to overcome as previously noted.

The prior art is also filled with other applications of tactile and visual direction indicators for other escape devices. U.S. Pat. No. 4,401,050 issued Aug. 30, 1983 to Britt et al. describes a escape route directional indicator for application to a surface, such as a building wall. Phosphorescent and tactile protruding arrows are applied in sequence to a sheet material surface such as an adhesive plastic tape. Similarly, UK Patent Application No. 2,224,154 published Apr. 25, 1990 describes an escape guidance aid, wherein a flexible adhesive tape when attached to a surface can be used to guide occupants of an enclosure to an exit by feeling along the tape or by viewing the tape. The tape is embossed or otherwise treated so that, when stroking the tape in one direction, it feels smooth, and rough in the opposite direction.

U.S. Pat. No. 4,179,160 issued Dec. 18, 1979 to Sabo describes a mine life line system utilizing a life line having tactile and luminescent directional indicating cones along its length. U.S. Pat. No. 4,416,309 issued Nov. 22, 1983 to Salim describes an indexed pipe so marked in a system of measurement to reveal the distance to pipe end locations during excavation.

Each of the escape aids described above have in common the concept of using a tactile and visual means by which to find an exit. But escape aids applied to a firehose have noted disadvantages. Hence, there exists a real and urgent need to provide a device which is capable of eliminating these disadvantages and is capable of directing a person to a safe exit along a firehose. The present invention addresses this need and provides a solution for the problems.

None of the above inventions and patents, taken either singly or in combination, is seen to describe the instant invention as claimed.

SUMMARY OF THE INVENTION

The present invention relates to a firehose coupling which helps fire fighters determine the direction to safety along a firehose. The inventive coupling not only has numerous advantages over the directional firehose devices found in the prior art, but also entirely eliminates the above noted disadvantages associated with those devices. This is possible because a coupling is an integral and necessary part of every firehose, so modifications thereto eliminate the need for a separate directional device attached to the firehose. Obviously, if no directional device is added to the firehose, none of its inherent disadvantages are present. However, to better understand the advantages gained by incorporating a directional indicator with a coupling for a firehose, the use and attachment of a standard coupling to a firehose should be understood.

Standard couplings for firehoses are well known in the prior art, and a general representation of such a coupling is illustrated in FIG. 6 of the Drawings. Each coupling is made up of two parts, a male component and female component, each further comprising of a cylindrical body having a threaded end and a firehose-accepting end. Male and female components are matingly threaded. The threaded end of the female component is further adapted to rotate independently of the firehose-accepting end. A firehose may be fixedly attached to the firehose-accepting end of each component, usually by a compression fitting. The circumferential edges of the firehose-accepting end of the cylindrical body are uniformly smooth, sometimes bevelled, on both components. A plurality of lugs are attached onto the circumferential outer surface of the cylindrical body of each component, whereby the coupling can be tightened by a spanner wrench when the threaded ends of the component parts are joined. Firehoses sold commercially are commonly sold with a male coupling on one end and a female coupling on the other.

An absolutely fundamental part of a fire fighter's training is the knowledge of which end of a firehose to bring forward to a fire. In order to get the nozzle to the fire, every fire fighter must know which coupling on a firehose is the forward end. Thus, one of the first rules learned by a fire fighter is that the direction of the male coupling component always indicates the direction of the water flow. This rule is fundamental because the male coupling component must connect with a female coupling component, ultimately ending at the nozzle. Thus every time a fire fighter handles the firehose, the knowledge that the male coupling indicates the direction of the water flow, hence the fire, is reinforced, and becomes nearly intuitive.

As simple as this rule is, and as well known by the fire fighter, the problem is recognizing the male coupling component under an emergency and limited visibility situation. Because a firehose's male and female coupling components are similar in construction (and moreover, various manufacturers have differently shaped components and various length tightening lugs), identification of the male component becomes an extremely cognitional act. This problem is exacerbated when trying to identify similar shaped components or lugs by touch through heavy gloves.

Therefore, the preferred embodiment of the present invention incorporates an elongated extension integrally attached to each lug of a male component of a firehose coupling, which extends a predetermined length beyond the perimeter of the cylindrical body of the male component only in a direction diametrically opposed to the direction by which said male component is inserted to couple with said female component. These extensions are easily identified visually, directing the viewer away from the fire and towards the source connection of the firehose. Additionally, the lug extensions may have raised or printed indicia on their surface further assisting a viewer. But even in low visibility situations and wearing heavy gloves, a fire fighter need only momentarily and lightly catch his thumb against the lug extension, and without hesitation know the firehose's water source direction.

Other embodiments of the invention may include any extension or tab which extends a predetermined length beyond the perimeter of the cylindrical body of the male component in a direction diametrically opposed to the direction by which said male component is inserted to couple with said female component. Tabs may be incorporated intermittently along the circumferential edge of the firehose-accepting end of the male component's cylindrical body, whereas the circumferential edge of the firehose-accepting end of the female component's cylindrical body would remain uniformly smooth.

Many advantages of the present invention in practice should become apparent. First, the directional extensions, being integrally molded onto the lugs, can withstand great abuse (especially if synthetic polymers are used, as presently used for the manufacture of lightweight and durable firehose couplings because of the polymers' ability to withstand the high temperatures, pressures and stresses to which firehose couplings are subject). The directional extensions may also be welded or cast during the manufacture of metal couplings. Second, the directional extensions are permanent, and thus the likelihood of human error is minimized. Should a female coupling without the directional extensions be mistakenly used in repair of the firehose at a later date, the firehose becomes inoperable, having two female ends. Third, unlike the devices found in the prior art, the directional extensions are unlikely to snag objects and become dislodged; as the firehose is being pulled towards a fire, the direction of the pull opposes the potential hook-like action of the extensions because the extensions face rearward.

Accordingly, it is a principal object of the invention to provide a directional firehose coupling with indicators which indicate the direction of the firehose to the source of the initial firehose connection.

It is another object of the invention to provide a directional firehose coupling which enables a person to easily visually and tactilely determine the direction of the firehose to the firehose water source connection.

It is a further object of the invention to provide a directional firehose coupling with indicators which extend beyond the perimeter of the cylindrical body of the male coupling component.

Still another object of the invention is to provide a directional indicator which eliminates the disadvantages associated with directional devices which attach at points between the ends of a firehose.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
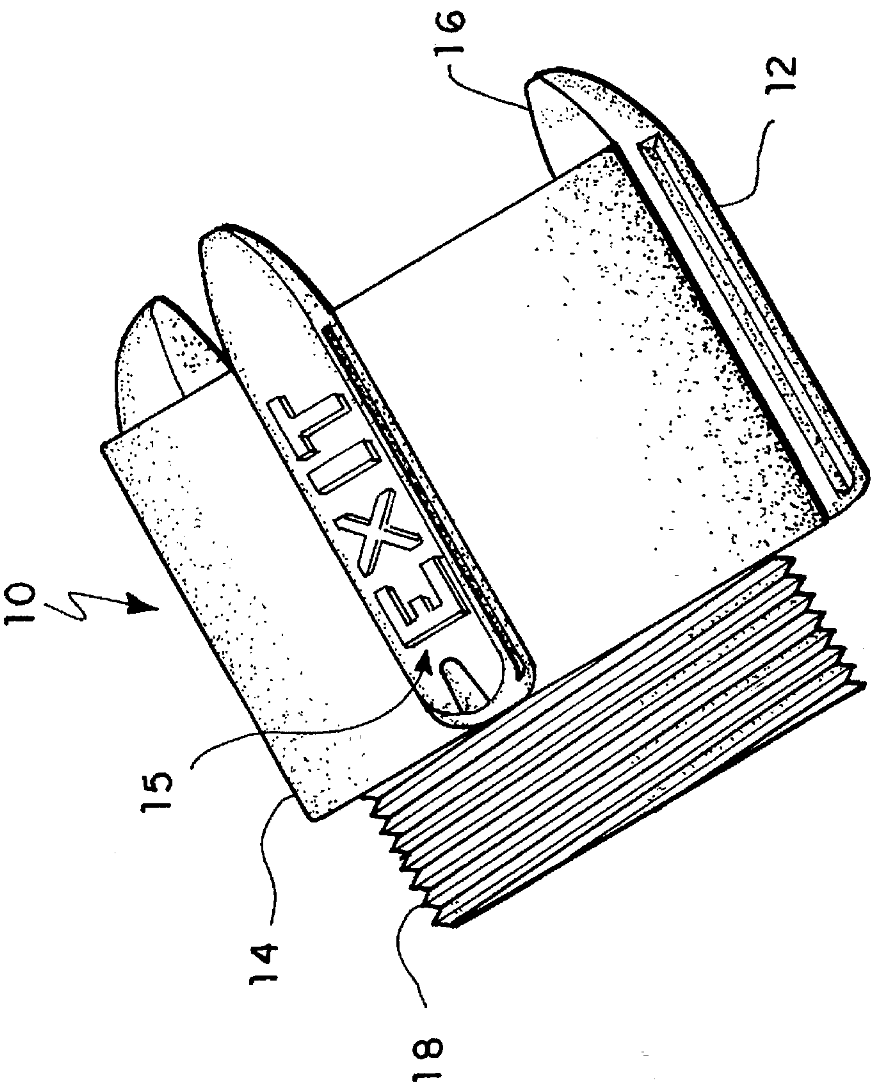
FIG. 1 is a side view of a male coupling component of a first embodiment.

The present invention relates to a firehose coupling which helps fire fighters determine the direction to safety along a firehose. Referring to FIG. 1, a male coupling component 10 is shown with a plurality of lugs 12 attached to the outside circumference of a cylindrical body 14 of the male coupling component 10. Each lug 12 features directional extensions 16 and a raised indicia 15 to visually assist the fire fighter to an exit. A threaded extension 18 of the male coupling component 10 is threaded so as to be matingly accepted by a female coupling component.

Figure 2:
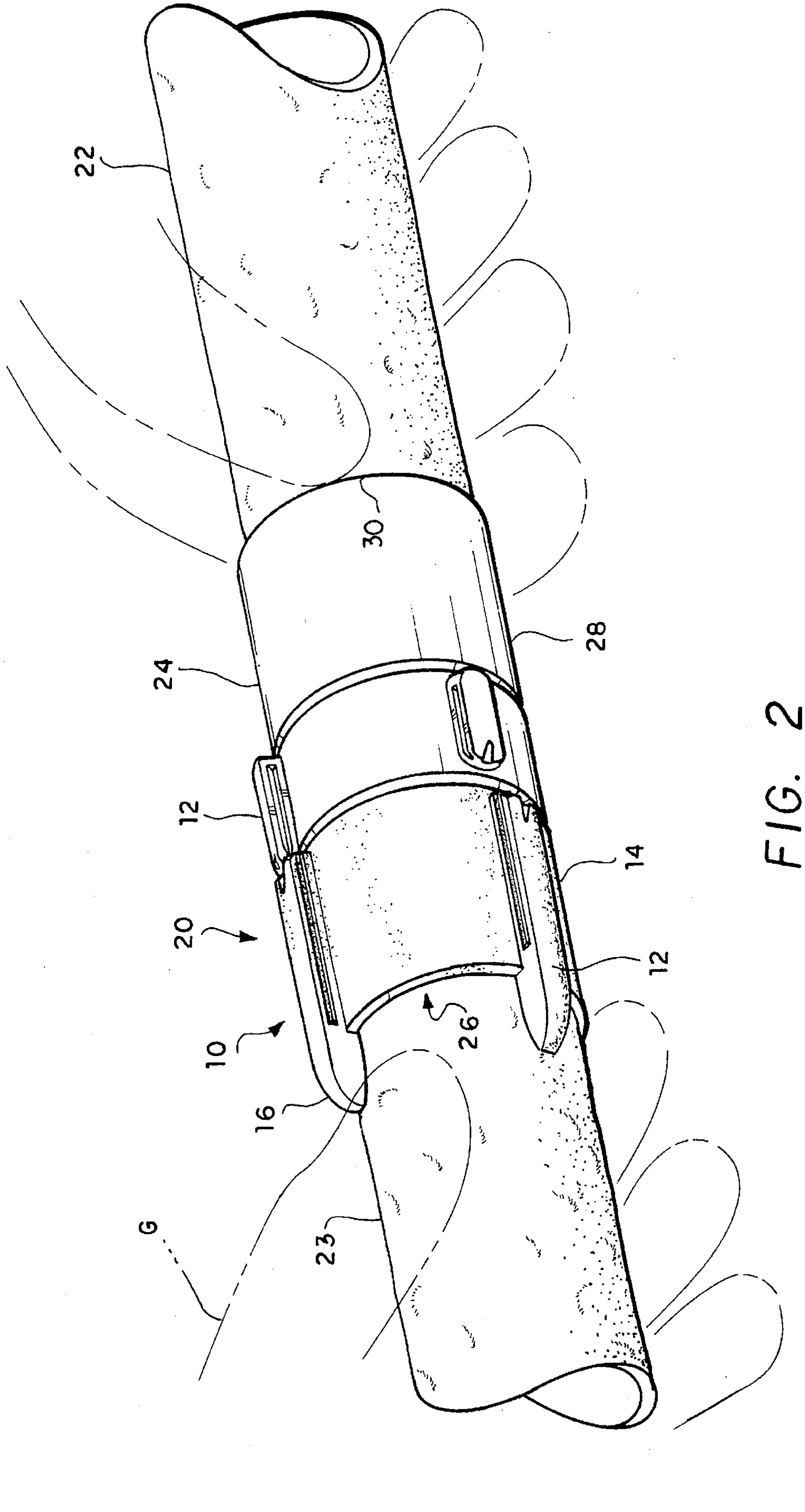
FIG. 2. is an environmental isometric view of the first embodiment of the firehose coupling on a firehose in use.

Referring next to FIG. 2, the male coupling component 10 and a female coupling component 20 are shown tightly joined. A first firehose 22 is attached to a female firehose-accepting end 24, and a second firehose 23 is connected to a male firehose-accepting end 26, which is an integral part of the cylindrical body 14. As can be readily observed, the female coupling component 20 is unlike the male coupling component in that it is made up of a cylindrical ring 28, to which a plurality of lugs 12 are attached, adapted to rotate independently of the female firehose-accepting end 24. Moreover, the circumferential edge 30 of the female firehose-accepting end 24 is uniformly smooth.

Figure 6:
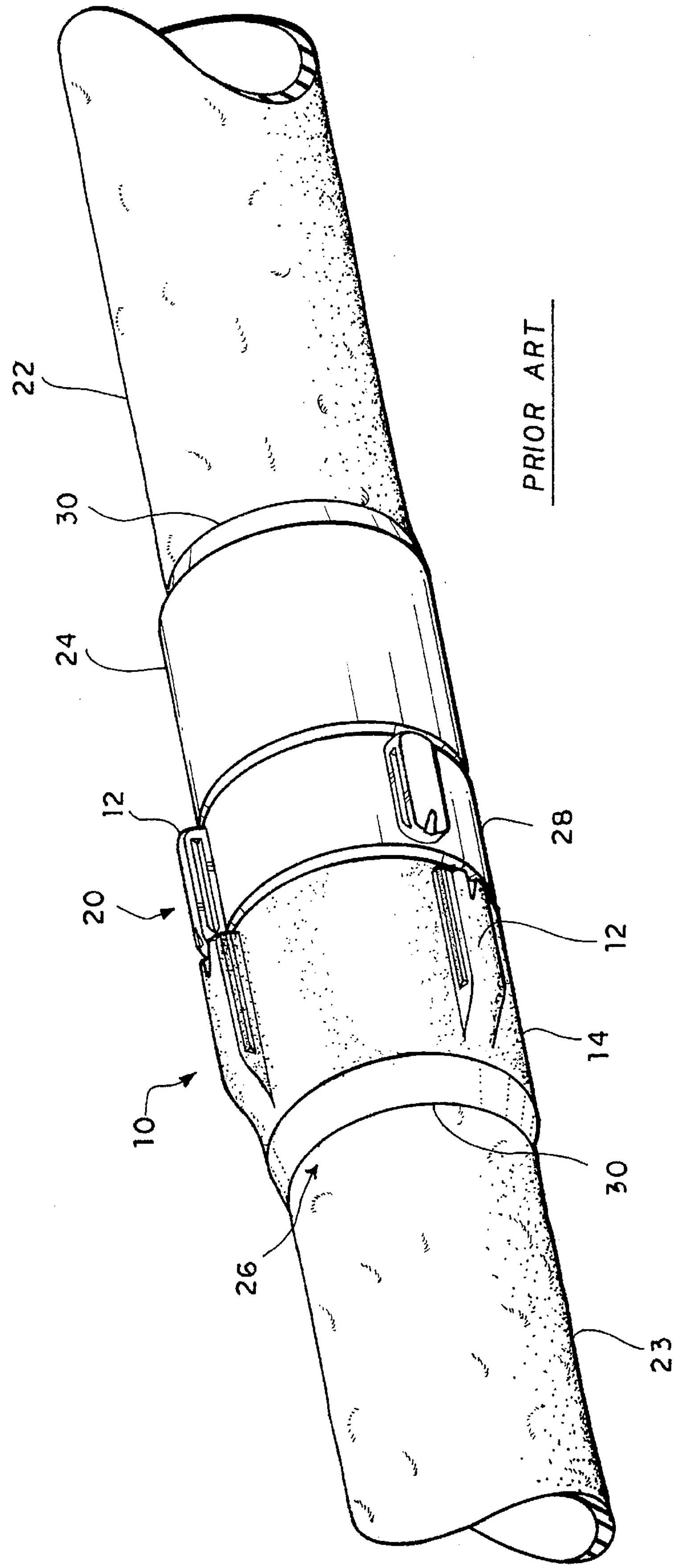
FIG. 6 is an isometric view of a firehose coupling found in the prior art.

In comparison and as can be readily observed in FIG. 6 which illustrates the prior art of firehose couplings generally, both the male firehose-accepting end 26 and the female firehose-accepting end 24 have circumferential edges 30 which are uniformly smooth around 360 degrees. These edges are sometimes bevelled. In contrast and referring again to FIG. 2, the lug extensions 16 are shown on the male coupling component 10 extending beyond the perimeter of the cylindrical body 14 of the male coupling component 10 in a direction diametrically opposed to the direction by which said male component is inserted to join with the female coupling component 20. When a fire fighter grasps the firehose 23 and probes the circumferential edges 30 of the firehose coupling, even through a heavy glove G, a fire fighter need only momentarily and lightly catch his thumb against the lug extension 16, and without hesitation know the firehose's water source direction.

Figure 3:
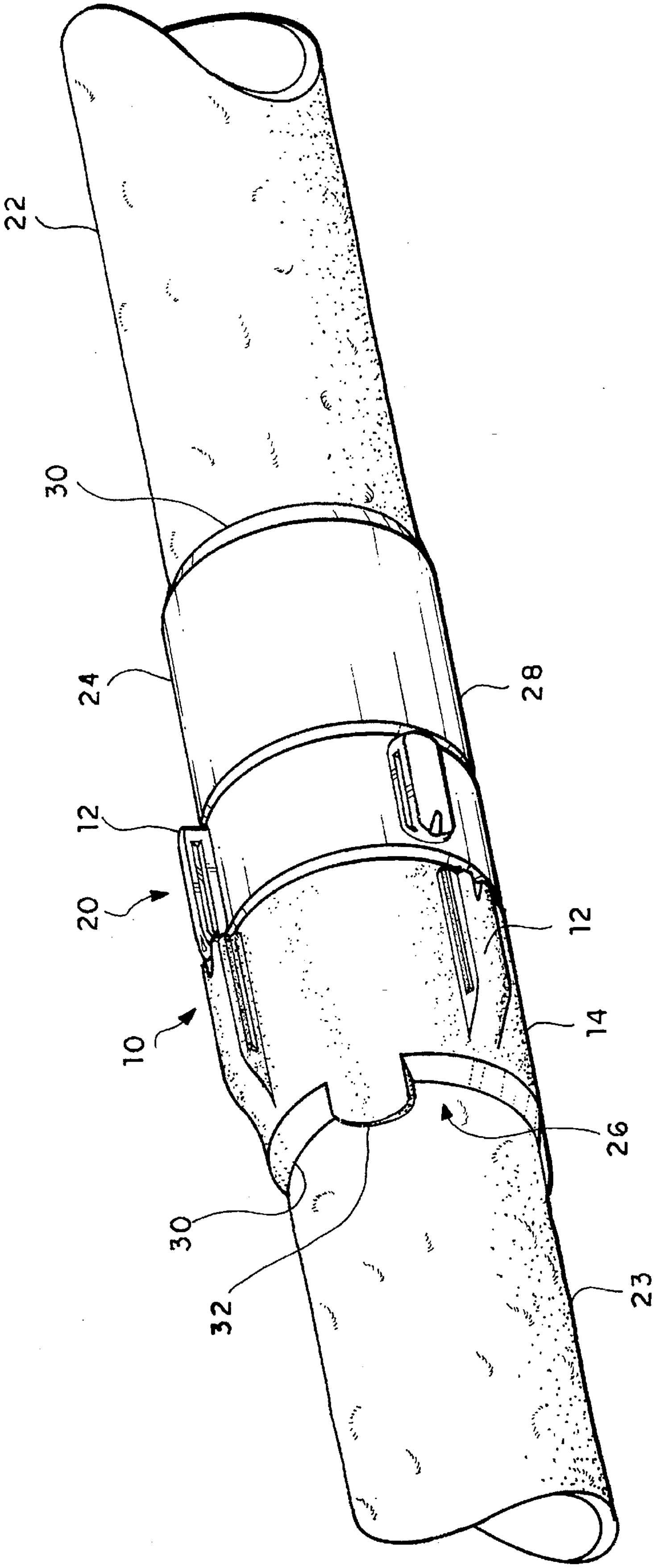
FIG. 3 is an isometric view of a second embodiment of a firehose coupling on a firehose.
Figure 4:
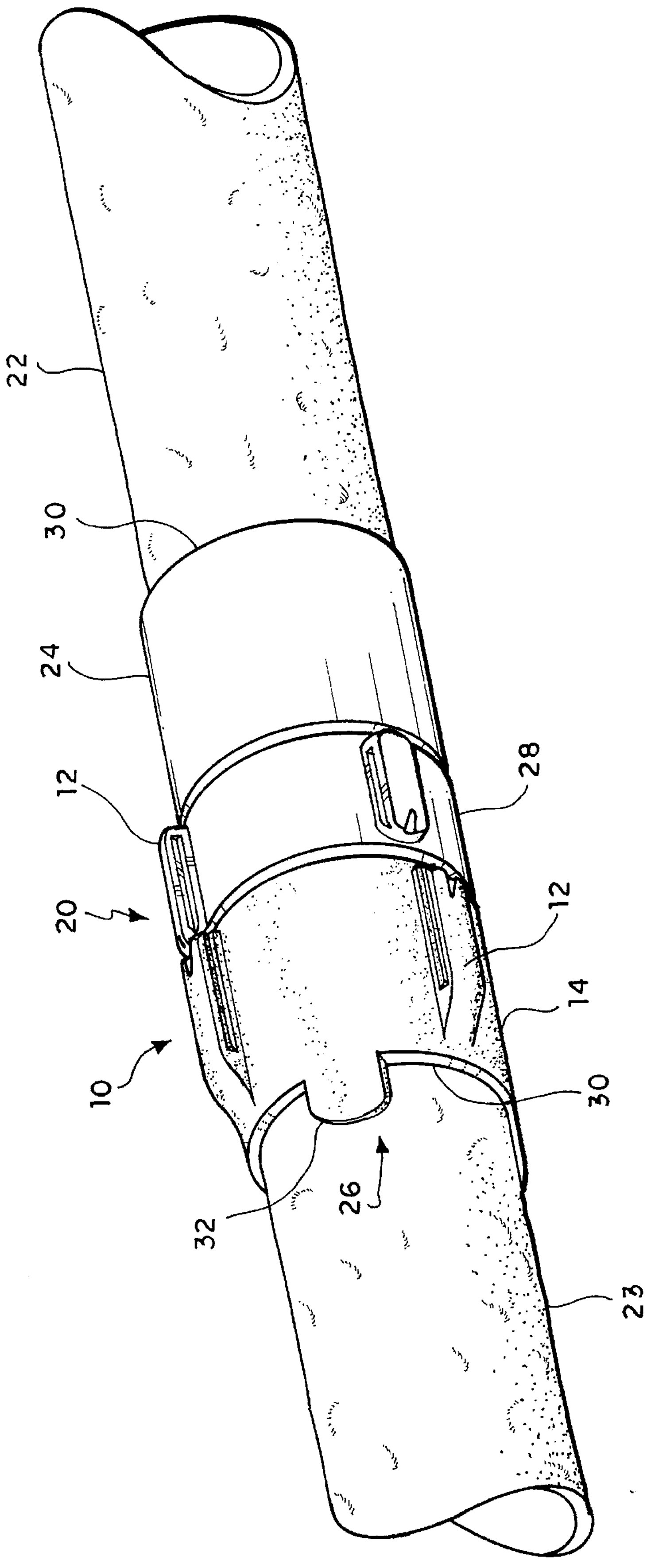
FIG. 4 is an isometric view of a third embodiment of a firehose coupling on a firehose.
Figure 5:
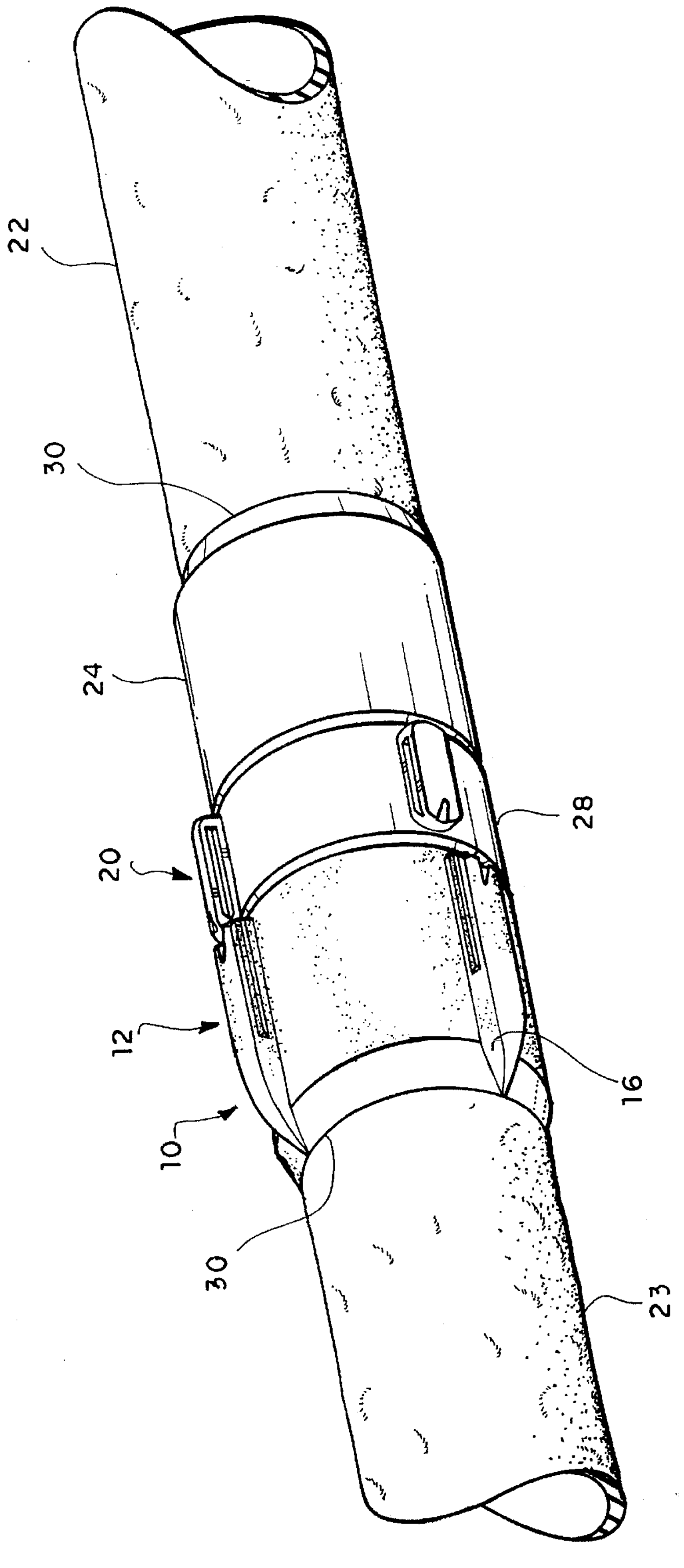
FIG. 5 is an isometric view of a fourth embodiment of a firehose coupling on a firehose.

FIGS. 3, 4 and 5 illustrate additional embodiments of the invention, which may include any type of extension or tab 32 which extends a predetermined length up to or beyond the perimeter of the cylindrical body of the male coupling component 10 in a direction diametrically opposed to the direction by which the male coupling component is inserted to join with the female coupling component. Tabs 32 may be incorporated intermittently along the circumferential edge 30 of the firehose-accepting end 26 of the male component's cylindrical body, whereas the circumferential edge 30 of the female firehose-accepting end 24 would remain uniformly smooth around 360 degrees. The embodiment of FIG. 3 is shown with a bevelled circumferential edge 30 (of the type shown in FIG. 6) with tabs 32 extending perpendicularly therefrom which may be of any shape and length sufficient to provide a visual and tactile indicator on the male coupling component 10. Similarly, in FIG. 4 the embodiment includes a squared circumferential edge 30 with tabs 32 likewise extending perpendicularly therefrom on the male coupling component 10. The embodiment of FIG. 5 is shown with a bevelled circumferential edge 30 (of the type shown in FIG. 6) in which the extensions 16 of the lugs 12 do not protrude beyond the perimeter of the male coupling component 10. Nevertheless, a tactile difference can be distinguished between the lug extensions 16 and the bevelled circumferential edges 30. Furthermore, the lug extensions 16 are tapered like a pointer to visually assist the fire fighter towards the water source connection of the firehose.

It is to be understood that the present invention is not limited to the sole embodiments described above, but encompasses any and all embodiments within the scope of the following claims.

I claim:

1. A directional firehose coupling system comprising:

means for coupling a first firehose having a female coupling component body with a second firehose having a male coupling component body, each said coupling component body being matingly configured; and at least one directional indicator having an elongated extension of said male coupling component body, said extension located opposite the direction in which said male coupling component body is inserted to couple with said female coupling component body for coupling respectively the second firehose with the first firehose, whereby the direction of a firehose water source is indicated to direct a fire fighter away from a fire and a safe exit towards the firehose water source.

2. The directional firehose coupling system of claim 1, wherein said male coupling component body, having a cylindrical body to enable connection to a firehose, includes a plurality of lugs attached around a circumference of said cylindrical body, and wherein said at least one directional indicator comprises an elongated extension of at least one of said lugs, said elongated extension extending longitudinally beyond a perimeter of said cylindrical body in a direction opposite the direction in which said male coupling component body is inserted to couple with said female coupling component body.

3. The directional firehose coupling system of claim 1, wherein said directional indicator is further marked with raised indicia, whereby said directional indicator provides a readable indication of the direction to a firehose water source .

4. The directional firehose coupling system of claim 1, wherein said at least one elongated extension comprises at least one tab attached around a circumferential edge of said cylindrical body of the male coupling component body extending beyond said cylindrical body in a direction opposite the direction in which said male coupling component body is inserted to couple with said female coupling component body.

5. A directional firehose coupling system comprising:

means for coupling a first firehose having a female coupling component body with a second fire hose having a male coupling component body, each said coupling component body being matingly configured; wherein said male coupling component body and said female coupling component body have bevelled outer edges, and at least one directional indicator comprising an elongated extension extending longitudinally to the perimeter of the bevelled outer edge of said male coupling component body in a direction opposite the direction in which said male coupling component body is inserted to couple with said female coupling component body, whereby a protrusion is formed upon said bevelled outer edge of said male coupling component body, whereby the direction of a fire hose water source is indicated to direct a fire fighter away from a fire and a safe exit towards the firehose water source.

6. The directional firehose coupling system of claim 5, wherein said protrusion upon said bevelled outer edge of said male coupling component body is tapered to form a point in a direction opposite the direction in which said male coupling component body is inserted to couple with said female coupling component body.

7. In a firehose coupling having a cylindrical male coupling component body and a cylindrical female coupling component body, each matingly threaded, said cylindrical male component body further having a plurality of lugs integrally attached around a circumference but not extending beyond the circumferential edge of the male coupling component body, the improvement comprising:

at least one elongated extension integrally attached to the male coupling component body of the firehose coupling and extending beyond a perimeter of said male component body in a direction opposite the direction by which said male component body is inserted to couple with a female component body, whereby the direction of a firehose water source is indicated to direct a fire fighter away from a fire and towards the firehose water source for a safe exit.

8. The directional indicator of claim 7, wherein said elongated extension is an extension of at least one lug on said male coupling component body.

9. The directional indicator of claim 8, wherein said elongated extension is tapered to form a point in a direction opposite the direction in which the male coupling component body is inserted to couple with the female coupling component body.

10. The directional indicator of claim 7, wherein said elongated extension is an extension from a bevelled circumferential edge of said male coupling component body.

11. The directional indicator of claim 8, wherein said elongated extension and said at least one lug form an integral unit, said unit further marked with raised indicia, whereby the directional indicator provides a readable indication of the direction to the firehose water source connection.

12. The directional firehose coupling system of claim 2, wherein each of said lugs has said directional indicator.

13. The directional firehose coupling system of claim 5, wherein said at least one tab includes multiple tabs attached intermittently around said circumferential edge.

* * * * *